US005781542A

United States Patent [19]
Tanaka et al.

[11] Patent Number: 5,781,542
[45] Date of Patent: Jul. 14, 1998

[54] INFORMATION COMMUNICATION SYSTEM USING MULTI-CODE CDMA MODE

[75] Inventors: Hirokazu Tanaka, Chiba; Tatsunori Saito, Yokohama, both of Japan

[73] Assignee: Kabushiki Kaisha Toshiba, Kawasaki, Japan

[21] Appl. No.: 565,754

[22] Filed: Nov. 30, 1995

[30] Foreign Application Priority Data

Dec. 2, 1994 [JP] Japan .................................. 6-299317

[51] Int. Cl.$^6$ ............................................. H04B 7/216
[52] U.S. Cl. ..................... 370/342; 370/536; 375/200; 375/286
[58] Field of Search ......................... 332/100, 120; 455/93, 142, 59; 375/200, 201, 206, 260, 286; 370/203, 204, 320, 335, 342, 441, 465, 466, 536

[56] References Cited

U.S. PATENT DOCUMENTS 5,539,770  7/1996  Ishigaki ............................... 455/93
5,592,469  1/1997  Szabo ................................. 370/342
5,612,948  3/1997  Fette et al. ......................... 370/468

OTHER PUBLICATIONS

Gottfried Ungerboeck, "Trellis–Coded Modulation With Redundant Signal Sets Part I: Introduction", IEEE Communications Magazine, vol. 25, No. 2, Feb. 1987, pp. 5–11.

Gottfried Ungerboeck, "Trellis–Coded Modulation With Redundant Signal Sets Part II: State of the Art", IEEE Communications Magazine, vol. 25, No. 2, Feb. 1987, pp. 12–21.

Primary Examiner—Benedict V. Safourek
Attorney, Agent, or Firm—Finnegan, Henderson, Farabow, Garrett & Dunner, L.L.P.

[57] ABSTRACT

A system adaptively determines the number of spread codes to use and a type of multi-valued modulation system based on the station of the system. Transmission information is divided into a number of sequences equal to the number of used spread codes. These sequences are error correction encoded, primarily modulated according to a selected one of a plurality of types of multi-valued modulation schemes, secondarily modulated by the selected spread codes, and transmitted.

19 Claims, 5 Drawing Sheets

FIG. 1

| MOBILE STATION | NUMBER OF SPREAD CODE | MODULATION SYSTEM | TRANSMISSION DATA |
|---|---|---|---|
| M S 1 | 8 | B P S K | COMPUTER DATA |
| M S 2 | 1 | B P S K | TELEPHONE |
| M S 3 | 4 | Q P S K | STILL PICTURE |
| M S 4 | 2 | Q P S K | FACSIMILE |
| M S 5 | 1 | Q P S K | FACSIMILE |

INFORMATION COMMUNICATION SYSTEM USING MULTI-CODE CDMA MODE

BACKGROUND OF THE INVENTION

1. Field of the Invention

The present invention relates to an information communication system for a digital mobile communication system or a digital radio LAN and, in particular, a system for communicating by a multi-code code division multiple access mode (hereinafter referred to as "an MC-DCMA mode") between a plurality of information communication apparatuses.

2. Description of the Related Art

Recently, as one of communication systems applied, for example, to a mobile communication system, a spread spectrum communication system which is strong against an interference or a disturbance is noted.

The spread spectrum communication system is used to realize a code division multiple access system (CDMA). The CDMA system modulates digitized voice data or image data by a digital modulation system such as a PSK modulation system in an apparatus of a transmission side, then converts the modulated transmission data into a base band signal of a wide band by using a spread code such as pseudorandom noise code (PN code), thereafter up-converts it to a radio frequency signal, and transmits the radio frequency signal. On the other hand, the CDMA system down-converts the received radio frequency signal into a signal of an intermediate frequency or a base band frequency, then reversely diffuses the radio frequency signal by using the same code as the spread code used in the apparatus of the transmission side, thereafter digitally demodulates the radio frequency signal by a digital demodulation system such as a PSK demodulation system, and then reproduces the received data in an apparatus of a reception side.

Developments of a radio multimedia communication have been recently frequently conducted. To realize the communication of this type, in addition to transmission of high reliability at a high speed, a multiple access system which can integrally handle various information having different properties and speeds like a voice, data, an image is necessarily indispensable. An MC-CDMA system is proposed as a system for responding to these requirements.

Figure 6:
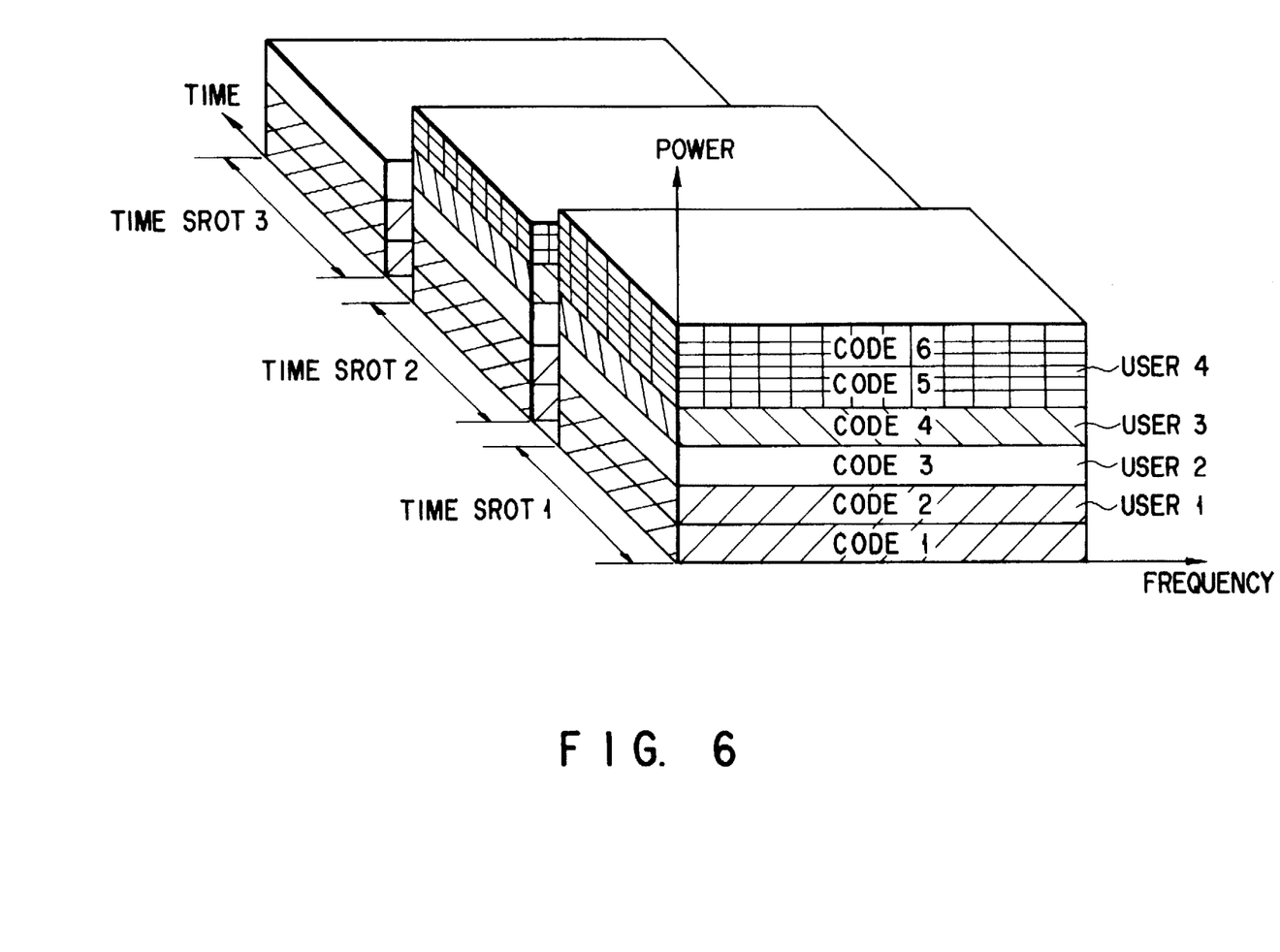
FIG. 6 is a view showing a concept of an MC-CDMA system.

This MC-CDMA system is a system for dividing transmission information into a plurality of signal sequences, modulating the signal sequences by different spread code sequences and transmitting the spread code sequences in parallel. According to this MC-CDMA system, an information transmitting speed can be accelerated by the number of sequences of the signals to be transmitted in parallel. Therefore, the information of various speeds can be efficiently transmitted at the respective users by altering the number of used spread code sequences in response to the transmitting information amount. FIG. 6 shows a concept of this MC-CDMA system. In FIG. 6, the cases that a user U1 uses codes 1 and 2, a user U2 uses a code 3, a user U3 uses a code 4 and a user U4 uses codes 5 and 6 in a time slot TS1 to transmit information are shown in a typical manner.

The MC-CDMA system employs, to prevent an interference between parallel signals in the same channel, an orthogonal spread code such as a Walsh-Hadamard conversion code as the spread code. Therefore, the number of the users in each channel depends upon the number of the orthogonal spread codes. Accordingly, if one user having many transmitting information amount use many spread

2 codes solely, the number of users who can simultaneously communicate in the same channel is limited. Further, if the users who use many spread codes are increased, the number of the users not only in the same channel but in the entirety is remarkably limited. In addition, if the user who transmits by using many spread codes is moved to other cell, it is necessary to allocate the spread codes of the same number as the number of the spread codes used in the original cell in the moved destination cell. However, if the number of the users during communicating in the cell of the moved destination cell is many, the spread codes of the same number as that of the spread codes used in the original cell cannot be allocated, with the result that a communication interruption might occur and is not hence very preferable.

SUMMARY OF THE INVENTION

An object of the present invention is to provide an information communication system which can transmit information of high quality at a high speed even when spread codes of necessary number cannot be obtained.

In order to achieve the object of the present invention, communication mode determining means for adaptively determining the number of used spread codes and the type of a multi-valued modulation system based on the state of the system is provided. Transmitting information is divided into number of sequences responsive to the number of used spread codes determined by the communication mode determining means to conduct an error correction encoding, a multi-valued modulation system determined by the communication mode determining means is selected from a plurality of types of multi-valued modulation systems having different numbers of multi-valued modulations, and the information sequence error correction encoded by the encoding means is primarily modulated by the selected multi-valued modulation system. The spread code of the used number of the spread codes determined by the communication mode determining means is selected from the plurality of the spread codes, the primarily modulated modulation signal sequence is secondarily modulated by the selected spread code, and transmitted.

More specifically, the present invention most advantageously so adaptively variably sets both the number of used spread codes and the number of the multi-valued modulations of the multi-valued modulation system as to always obtain optimum transmitting quality and speed in response to the state of the system, and communicates the information in response to the set result.

Therefore, according to the present invention, the number of used spread codes and the type of the multi-valued modulation system are so decided based on the state of the system such as the quality of a transmission line and the number of the information communication apparatuses as to always obtain the optimum transmitting quality and efficiency, thereby transmitting the information.

To this end, even when the number of the information communication apparatuses which are communicating or request for the communications is many and hence spread codes of sufficient number cannot be allocated to the one information communication apparatus, information transmission of the high quality at the high speed can be executed by allocating the multi-valued modulation system having many number of the multi-valued modulations.

On the contrary, if the number of the information communication apparatuses which request communications is small, many spread codes can be allocated to the one information communication apparatus. Therefore, even when the quality of one transmission line is, for example, wrong and it is difficult to use modulation systems having mode multi-valued modulations, information transmission of high quality at high speed can be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DESCRIPTION OF THE PREFERRED EMBODIMENTS (First Embodiment)

Figure 1:
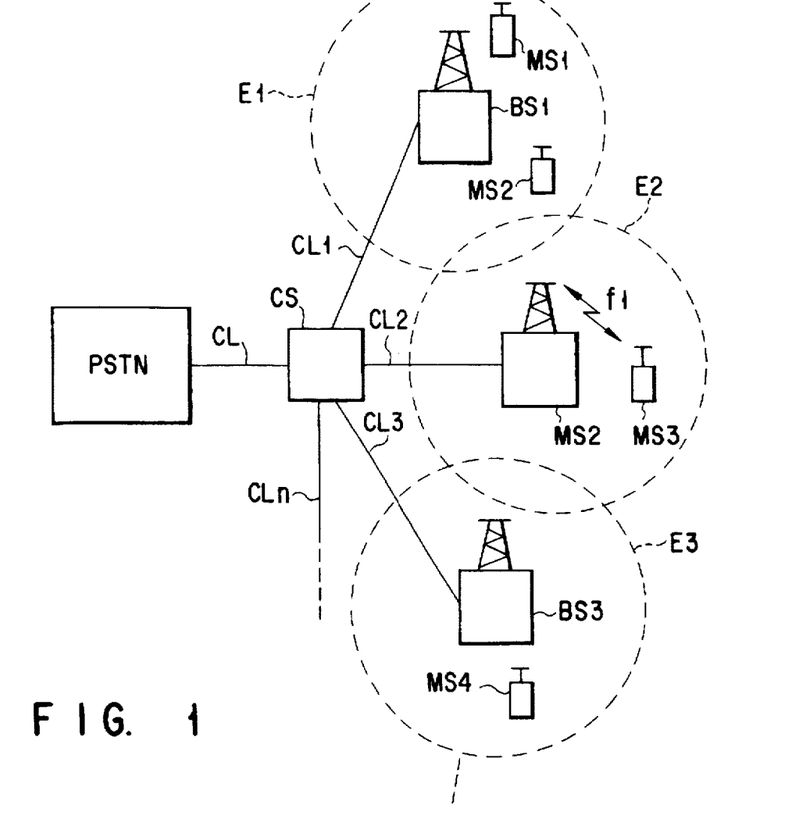
FIG. 1 is a schematic structural view of a cellular communication system according to a first embodiment of the present invention.

FIG. 1 is a schematic structural view of a cellular mobile communication system according to a first embodiment of the present invention.

This system comprises a control station CS, a plurality of base stations BS1, BS2, . . . , and a plurality of mobile stations MS1, MS2, . . . . The control station CS is connected to a public switched telephone network (PSTN) through a wire channel group CL. The respective base stations BS1, BS2, . . . are connected to the control station CS through wire channels CL1, CL2, . . . . The base stations BS1, BS2, . . . form radio zones E1, E2, . . . which are called "cells". A plurality of radio frequencies are so allocated to the cells E1, E2, . . . that the radio cells. As an access system between the base stations BS1, BS2, . . . and the mobile stations MS1, MS2, . . . , an MC-CDMA system is employed, and a time division duplex (TDD) is, for example, employed as a signal multiplex system.

Figure 2:
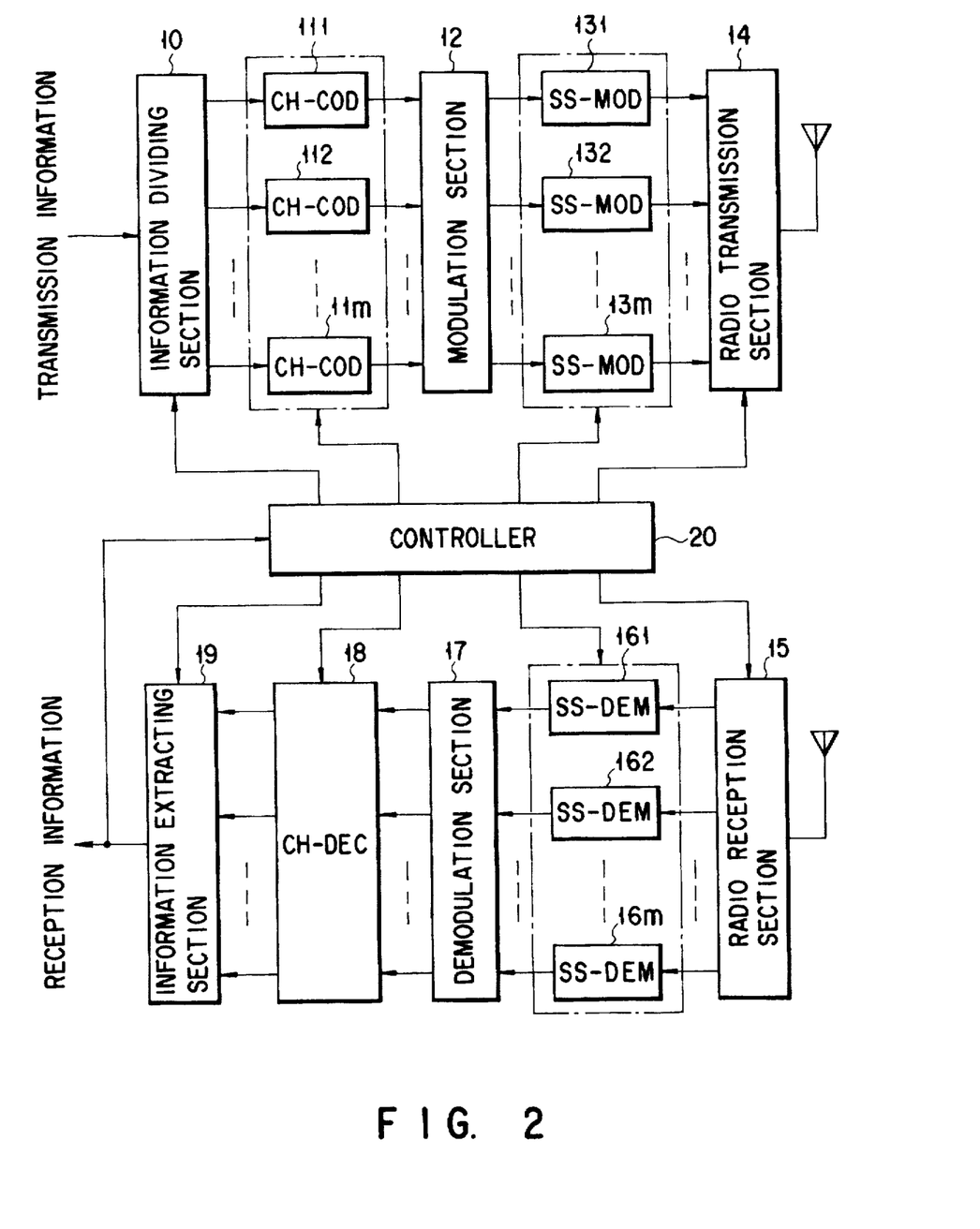
FIG. 2 is a circuit block diagram showing a configuration of a mobile station of the system shown in FIG. 1.

FIG. 2 is a block diagram showing a configuration of the mobile stations MS1, MS2, . . . .

The mobile station has, in a transmission system, an information dividing section 10, m pieces of channel-encoders 111–11m, a mapping and multi-valued modulation section 12, m pieces of spread spectrum modulation sections 131–13m, and a radio transmission section 14, and, in a reception system, a radio reception section 15, m pieces of spread spectrum demodulation sections 161–16m, a demodulation section 17, a channel-decoder 18, and an information extracting section 19. The mobile station has a common controller 20 common for the transmission system and the reception system.

The information dividing section 10 divides transmission information output from a transmission information processing section (not shown) into m pieces at the maximum according to the number of divisions designated from the controller 10 and outputs the transmission information. The channel-encoders 111–11m error correction encode a plurality of information sequences output from the information dividing sections 10, and outputs the information sequences. The mapping and multi-valued modulation section 12 maps the information sequences output from the channel-encoders 111–11m according to the multi-valued modulation system designated by the controller 20, then modulate the information sequences and outputs the sequences. The spread spectrum modulation sections 131–13m spread spectrum modulate the multi-valued modulation signals output from the mapping and multi-valued modulation section 12 by using the spread code designated by the controller 20, and outputs the multi-valued modulation signals. The radio transmission section 14 synthesizes the multi-valued modulation signals spread spectrum modulated as above, then up-converts the multi-valued modulation signals, amplifies the modulation signals to predetermined transmission power, and transmits the modulation signals from an antenna to the base station.

The radio reception section 15 high-frequency amplifies the radio frequency signal from the base station received via the antenna, down-converts the signal to an intermediate frequency signal, further divides the signal into m pieces, and supplies the m pieces of the signals to the spread spectrum demodulation sections 161–16m. These spread spectrum demodulation sections 161–16m reversely diffusion demodulate the reception signal supplied from the radio reception section 15, and supply the signal to the demodulation section 17. The demodulation section 17 primarily demodulates the demodulation signals supplied from the spread spectrum demodulation sections 161–16m according to the multi-valued modulation system designated by the controller 20. The error correction decoding section 18 error correction decodes the demodulation signals output from the demodulation section 17, and outputs the signals. The information extracting and synthesizing section 19 extracts necessary information sequence from the plurality of the reception information sequences output from the channel-decoder 18 according to the designation of the controller 20, then synthesizes the extracted information sequences with the information of one sequence, and supplies the synthesized information to a reception information processing section (not shown).

The controller 20 has, for example, a micro-computer. The controller 20 transmits request information such as the type of information to be transmitted, an information amount and a communication mode desired by a user to the base station by using a control signal at the time of starting the communication or during the communication. Further, the controller 20 controls the operation by designating the number of used spread codes and the multi-valued modulation system to the circuits based on the communication mode informed by using the control information from the base station.

On the other hand, the base station has functions of selecting an optimum communication mode for the communication with the mobile station based on the request information transmitted from the mobile station, the measured result of the state of the radio transmission state with the mobile station and the number of the users during the communication or the communication requesting in the cell at the time of the communication with the mobile station and during the communication, and informing the information for representing the communication mode to the corresponding mobile station.

Then, an operation of the system constructed as described above will be described. In this embodiment, the case that the system has 16 spread codes per one cell and four modulation systems having different multi-valued modulations of BPSK, QPSK, 8PSK and 16PSK as the modulation systems will be described as an example.

It is assumed that a plurality of mobile stations (users) communicate by using level spread codes. It is also assumed that another user transmits a request for desiring a communication by using, for example, BPSK system and eight spread codes to the base station in this state.

On the other hand, the base station estimates the state of a radio transmission line to the mobile station of a transmitter of the request. The transmitting state is estimated by measuring a reception power level of a bit error rate of the control signal coming from the mobile station. An optimum communication mode is selected as follows based on the estimated result of the transmission line state, the number of the mobile stations in the cell and a request content of the mobile station.

(1) The case that transmission line state is more preferable than a predetermined state and number of mobile stations in a cell is less than a predetermined number.

There is no problem at the present time point even if the eight spread codes are allocated as the request of the mobile station. When all the eight spread codes are allocated, the residual spread code is only one. Therefore, to hold allowance in the system, four spread codes are, for example, set, the modulation system is set to QPSK system, and the set results are informed to the mobile station as the communication mode.

When this communication mode is informed, the controller 20 of the mobile station designates the number of divisions of the transmission information for the information dividing section 10 in response to the communication mode, applies a designation for operating the circuits of the necessary number of the sequences for the channel-encoders 11l–11m and the spread spectrum modulation sections 13l–13m, and further designates the QPSK system for the mapping and multi-valued modulation section 12. Therefore, the mobile station primarily modulates the transmission information by the QPSK system, secondarily modulates the information by the four spread codes, and transmits the information toward the base station.

As described above, the information transmission of high quality at a high efficiency can be executed by the QPSK system while holding the allowance in the spread codes.

(2) The case that transmission line state is more preferable than a predetermined state and number of mobile stations in a cell is more than a predetermined number.

Since the number of the mobile stations is many, the spread codes of requested number cannot be allocated. However, since the transmission line state is preferable, the number of the multi-valued modulations can be increased. Therefore, the number of the spread codes is set, for example, to two, the modulation system is set to 16PSK system, and the set results are transmitted to the mobile station as the communication mode.

When the communication mode is informed, the controller 20 of the mobile station designates the number of divisions of the transmission information for the information dividing sections 10 in response to the communication mode, applies for an operation of circuits of the necessary numbers of sequences to the channel-encoders 11l–11m and the spread spectrum modulation sections 13l–13m, and further designates the 16PSK system for the mapping and multi-valued modulation section 12. Therefore, the mobile station primarily modulates the transmission information by the 16PSK system, secondarily modulates the information by the two spread codes, and transmits the information to the base station.

Therefore, the number of the spread codes is small, but information transmission of sufficiently high quality at a high efficiency can be executed by the 16PSK system.

(3) The state that a transmission line state is worse than a predetermined state and number of mobile stations in a cell is less than a predetermined number.

Since the transmission line state is wrong, it is impossible to use the multi-valued modulation system. However, since the number of the mobile stations is small, there is less problem even if many spread codes are allocated. Therefore, the number of the spread codes is set to eight as requested by the mobile station, the modulation system is set to the BPSK system, and the set results are informed to the mobile station as the communication mode.

The controller 20 of the mobile station designates the number of divisions of the transmission information in response to the informed communication mode, applies a designation for operation of circuits of necessary number of sequences of channel-encoders 11l–11m and spread spectrum modulation sections 13l–13m, and further designates the BPSK system for the mapping and multi-valued modulation section 12. Therefore, the mobile station primarily modulates the transmission information by the BPSK system, secondarily modulates the information by the eight spread codes, and transmits the information to the base station.

Therefore, the number of residual spread codes in the cell has less allowance, but since the information can be transmitted in parallel with the eight sequences, information transmission of high quality at a high efficiency can be executed.

(4) The case that a transmission line state is worse than a predetermined state and number of mobile stations in a cell is more than a predetermined number.

Since the number of the mobile stations is many, many number of spread codes cannot be allocated, and since the transmission line state is wrong, it is impossible to employ the multi-valued modulation system. Then, it is judged that transmission of information amount as requested of the mobile station is difficult, two spread codes are, for example, set, the modulation system is set to the BPSK system, and the set results are informed to the mobile station as the communication mode.

The controller 20 of the mobile station designates the number of divisions of the transmission information in response to the informed communication mode, applies a designation for operation of circuits of the necessary numbers of sequences of the channel-encoders 11l–11m and the spread spectrum modulation sections 13l–13m, and further designates the BPSK system for the mapping and multi-valued modulation section 12. Therefore, the mobile station primarily modulates the transmission information by the BPSK system, secondary modulates the information by the two spread codes, and transmits the information toward the base station.

Therefore, in this case, the information cannot be transmitted at a transmission efficiency as requested by the mobile station. However, when communication of other mobile station is, for example, finished during the information transmission or quality of the transmission line is improved, the number of the spread codes or the number of the multi-values of the modulation system is altered, and the transmission of the information can be continued.

An example of an operation of the case that the alteration of the communication mode is designated for the mobile station during communication will be described.

Figure 3:
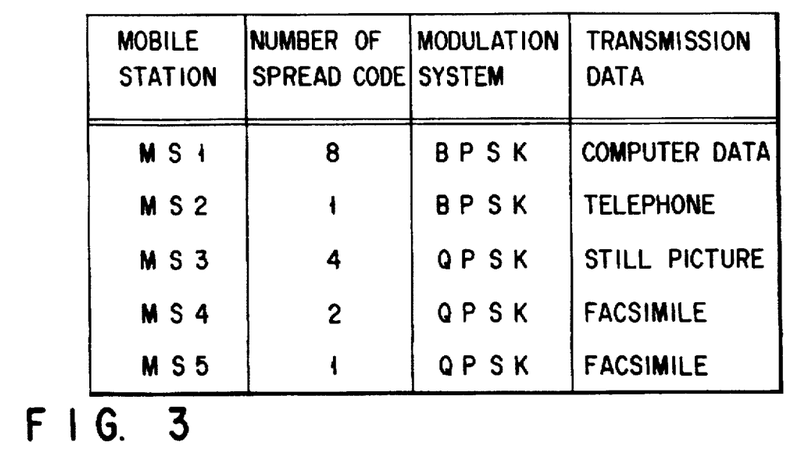
FIG. 3 is a view showing an example of a communicating state of the mobile station existing in an arbitrary cell.

It is now assumed that mobile stations S1–MS5 existed in the cell communicate information in a communication mode as shown in FIG. 3.

(1) It is assumed that new mobile station MS6 is moved from other cell in this state and that a communication request for desiring a telephone communication by a BPSK system and a spread code number 1 is transmitted. In this case, the base station, for example, releases one of eight spread codes desired by the mobile station MS1 and controls to allocate the released one spread code for the mobile station MS6.

More specifically, an alteration designation to a communication mode altered as follows is transmitted for the mobile station MS1 during communication. The content of the altered communication mode includes seven spread codes and allocates the BPSK system for the six of the seven spread codes and the QPSK system for the residual one spread code.

As a result, the mobile station MS1 alters the number of divisions of the information by the information dividing section 10 to the value corresponding to the level spread codes according to the alteration designation of the communication code, and the modulation system of the mapping and multi-valued modulation section 12 is altered to the BPSK system and the QPSK system. Thereafter, the information is continuously transmitted according to the communication mode after the alteration.

Subsequently, the base station sets the modulation system to the BPSK system for the new mobile station MS6 and informs the communication mode for setting the number of the spread codes to one to the mobile station MS6. Therefore, the mobile station MS6 does not divide the information by the information dividing section 10 in response to the informed communication mode, and sets the BPSK system as the modulation system to the mapping and multi-valued modulation section 12. Therefore, the mobile station MS6 starts transmitting of the information using the BPSK system and the one spread code.

As described above, even when the sixteen spread codes allocated for the cell are all used, new mobile station MS6 is allocated for the spread code by altering part of allocation of the spread codes during using to be transmitted. Further, the multi-valued modulation system of a high efficiency is designated as the modulation system for the mobile station in which the number of allocated spread codes is reduced, and hence the mobile station can continue to transmit the information without introducing a decrease in the transmission efficiency.

(2) It is also assumed that the mobile station MS2 finishes the communication after the control in the above paragraph (1) and one spread code is released. In this case, the base station stores and holds the communication mode before the allocation alteration of the mobile station MS1 in which the number of allocated spread codes is, for example, reduced from eight to seven under the control of the above paragraph (1). The released one spread code is additionally allocated for the mobile station MS1 to recover the number of allocated spread codes according to the communication mode, and the number of the spread codes after the allocation alteration and the modulation system corresponding thereto are informed to the mobile station MS1.

As a result, the mobile station MS1 again uses only the BPSK as the modulation system, and transmits the information using the eight spread codes. (3) On the other hand, it is assumed that the mobile station MS6 which uses the BPSK system as the modulation system and conducts a telephone communication by using the one spread code transmits a communication request using the BPSK system and the two spread codes to alter the communication content from the telephone to a facsimile communication during the communication. However, since the spread code released by the mobile station MS2 under the control of the above paragraph (2) is already reallocated for the mobile station MS1 at present, there is no empty spread code. Therefore, the base station designates to alter the modulation system from the BPSK system to the QPSK system for the mobile station MS6 without increasing the spread code.

As described above, the mobile station MS6 can transmit facsimile data at twice transmission efficiency of the BPSK system by the BPSK system even when the transmission signal sequence remains one.

When the base station designates alteration of the communication mode for the mobile station during communication, the designation of the alteration of any mobile station is considered for decision of communication content (image data by computer data, facsimile data, television telephone, voice data by a telephone) of each mobile station according to a predetermined priority order or decision of designation of the alteration in response to a reservation by reserving an alteration request of the communication mode for the base station by the mobile station which cannot be allocated as requested.

The dividing operation of the information by the information dividing section 10 may be so set that significances of a plurality of information sequences obtained after the division are different. In this case, the channel-encoders 111–11m error correction encode the information sequence of high significance with high error correction capacity, and error correction encode the information sequence of low significance with low error correction capacity. The mapping and multi-valued modulation section 12 applies the modulation system with high reliability for the information sequence having high significance, and applies the modulation system with low reliability for the information sequence having low significance.

For example, when image information is transmitted, information having high significance such as a control signal like a frame synchronizing signal and a low frequency component like an image signal and information having relatively low significance such as high frequency component like an image signal are divided into separate information sequences. The information sequence such as the control signal, the low frequency component is error correction encoded by using the encoding system having high error correction capacity and the high frequency component is error correction encoded by using the encoding system having low error correction capacity.

(Second Embodiment)

This embodiment disposes spread spectrum modulation sections before and after a mapping and multi-valued modulation section, executes a first spread spectrum modulation of a modulation signal before mapping and multi-value modulation of the information sequence is conducted, further executes a second spread spectrum modulation of a modulation signal after mapping and multi-valued modulation of the information sequence, and transmits it.

Figure 4:
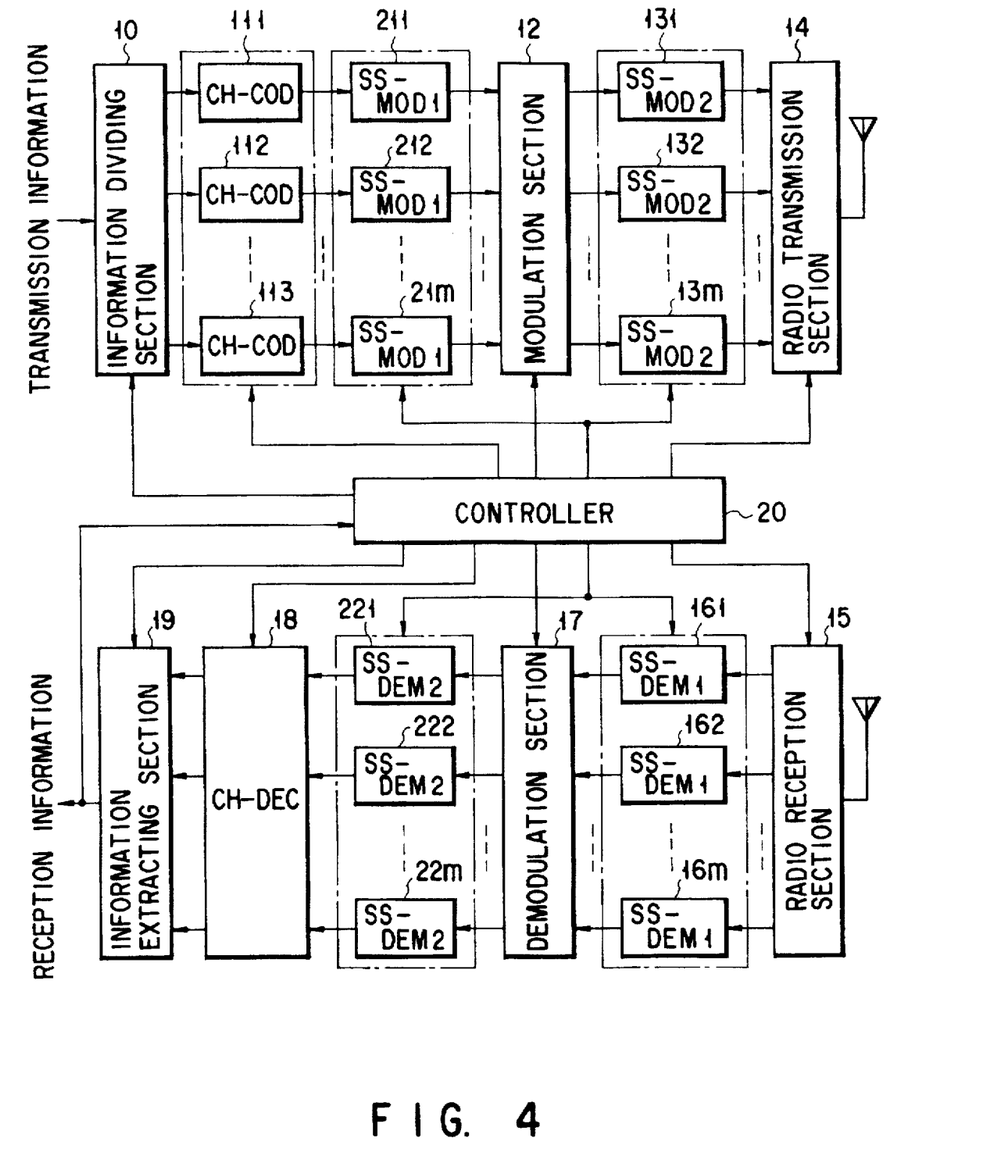
FIG. 4 is a circuit block diagram showing a configuration of the mobile station of a cellular mobile communication system according to a second embodiment of the present invention.

FIG. 4 is a circuit block diagram showing a configuration of a mobile station of a cellular radio communication system according to the second embodiment of the present invention. In FIG. 4, the same reference numerals as those in FIG. 2 designate the corresponding components, and hence a detailed description thereof will be omitted.

M pieces of first spread spectrum modulation sections (SS-MOD1) 211–21m are arranged between channel-encoders 111–11m and a mapping and multi-valued modulation section 12 of a transmission system. These first spread spectrum modulation sections 211–21m execute first spread spectrum modulation for information sequence signals output from the channel-encoders 111–11m, and supply the information sequence signals after the first spread spectrum modulation to the mapping and multi-valued modulation section 12. As the first diffusion modulation, an orthogonal spread code based, for example, on Walsh-Hadamard conversion is used.

M pieces of second spread spectrum demodulation sections (SS-DEM2) 221–22m are arranged between a demodulation section 17 and an error correction decoding section 18. These second spread spectrum demodulation sections 221–22m reversely diffusion demodulate the demodulation signals output from the demodulation section 17, and supply the signals to the error correction decoding section 18.

Since such a configuration is provided, the information sequence divided by the information dividing sections 10 are input to the corresponding channel-encoders 111–11m, and error correction encoded. The information sequences error correction encoded are executed for the first diffusion modulation by an orthogonal spread code based on Walsh-Hadamard conversion by corresponding first spectrum diffusion modulation sections 211–21m. The information sequences which are executed for the first diffusion modulation are multi-value modulated by the mapping and multi-value modulation section 12. The modulation signal output from the mapping and multi-value modulation section 12 is again diffusion modulated by second spread spectrum modulation sections (SS-MOD2) 131–13m, and transmitted.

Even in the case of this second embodiment, similarly to the first embodiment described above, the number of used spread codes and the number of the multi-valued modulations of the mapping and multi-valued modulator 12 are variably set by the controller 20 in response to a designation from a base station. Therefore, information transmission with optimum transmitting quality and speed can be executed in response to the states of the communication mode and system desired by a mobile station user.

Further, according to this second embodiment, the first spread spectrum modulation is executed before the mapping and multi-valued modulation are executed, and the second spread spectrum modulation is executed after the multi-valued modulation. Therefore, the orthogonality of the information sequence signal to be supply for the mapping and multi-valued modulation is improved. As a result, secretiveness is higher than that of the first embodiment, and information transmission of high quality in which influence of an interference by other mobile station is scarcely affected can be executed.

(Third Embodiment)

This third embodiment has a channel-encoder for error correction encoding an information sequence of m sequences with an encoding rate (m/(m+1)), and the channel-encoder is formed of one circuit.

Figure 5:
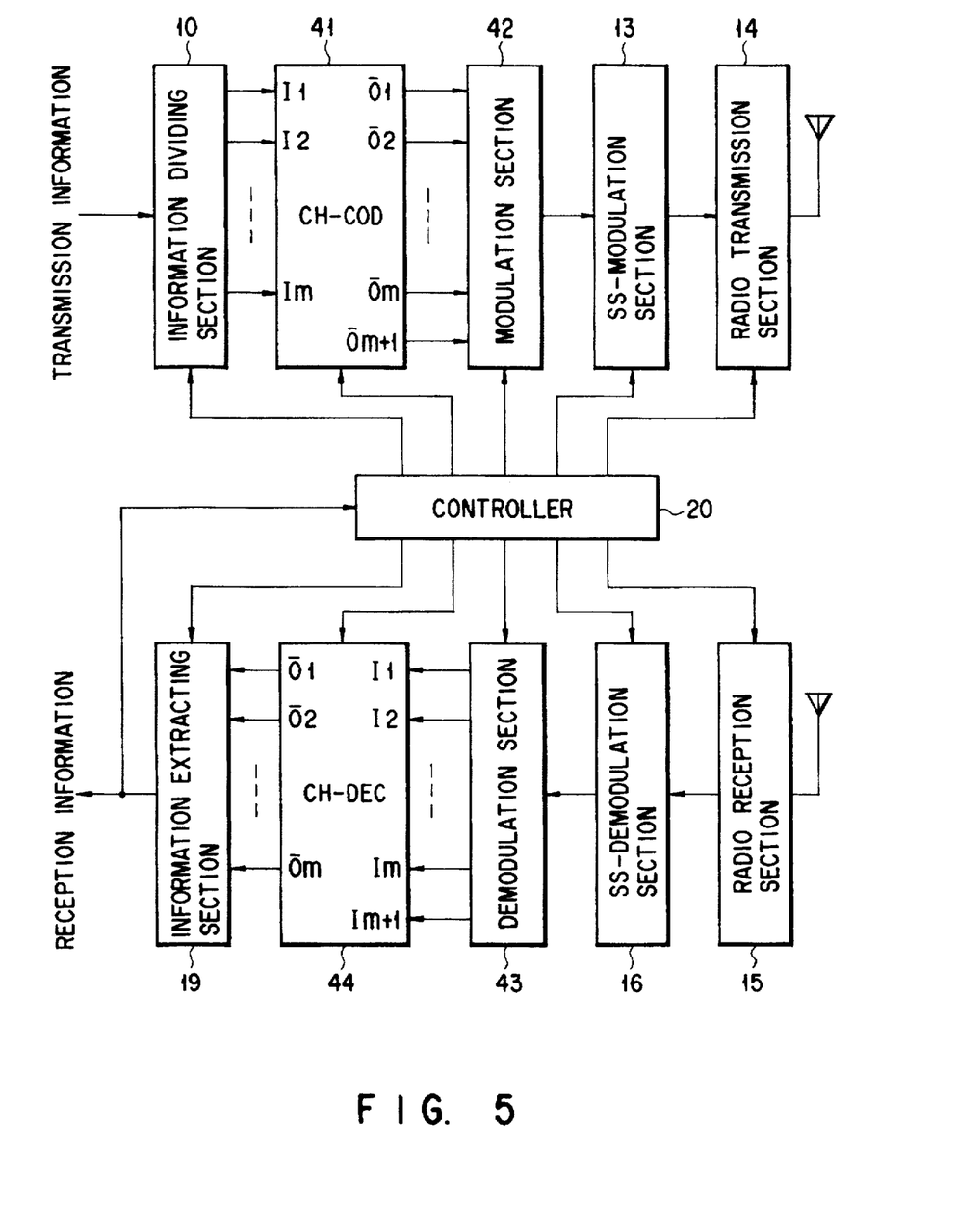
FIG. 5 is a circuit block diagram showing a configuration of the mobile station of the cellular mobile communication system according to a third embodiment of the present invention.

FIG. 5 is a circuit block diagram showing a configuration of a mobile station of a cellular radio communication system according to the third embodiment of the present invention.

In FIG. 5, the same reference numerals as those in FIG. 2 designate corresponding components, and hence a detailed description thereof will be omitted.

The mobile station of this third embodiment has, in a transmission system, an information dividing section 10, a channel-encoder 41, a $2^{m+1}$ value mapping and multi-valued modulation section 42, a spread spectrum modulation section 13, and a ratio transmission section 14, and in a reception system, a radio reception section 15, a spectrum diffusion section 16, a demodulation section 43, an error correction decoding section 44 and an information extracting and synthesizing section 19.

The channel-encoder 41 executes error correction encoding of an encoding rate (m/(m+1)) for an information sequence signal of m sequences input from the information dividing section 10 to input terminals I1–Im. The information sequence signals of m sequences are output from output terminals O1–Om, and a parity bit train of one sequence is output from the output terminal $O_{m+1}$. The $2^{m+1}$ value mapping and multi-valued modulation section 42 executes mapping and multi-valued modulation of the information sequence signal and the parity bit train output from the channel-encoder 41 to a $2^{m+1}$ value signal point space, and the modulation signal is input to the spread spectrum modulation section 13.

With such a configuration, the information sequence signal of m sequences output from the information dividing section 10 is executed for the error correction encoding of an encoding rate (m/(m+1)) by the channel-encoder 41, and then executed for the mapping and multi-valued modulation in $2^{m+1}$ by $2^{m+1}$ value mapping and multi-valued modulation section 42.

In this case, a process from the information division to the mapping and multi-valued modulation can be executed by using a processing method based, for example, on Trellis coding modulation system. The coding modulation system was described in detail in a thesis "Trellis Coding Modulation with Redundant Signal Sets part I/II" of Vo. 25, No. 2 of IEEE COMMUNICATION MAGAZINE by G. Ungerborck.

Even in this third embodiment, similarly to the first embodiment, the number of used spread codes and the number of multi-valued modulations can be variably set by the controller 20 in response to a designation from the base station. Therefore, the information transmission in which transmitting quality and speed become optimum can be executed in response to the states of the communication mode and the system desired by a mobile station user.

Further, in this third embodiment, the channel-encoder 41 is formed of one. Thus, as compared with m pieces of the channel-encoders 111–11m, a circuit scale can be reduced in size and simplified in configuration.

The present invention is not limited to the particular embodiments. For example, the information dividing sections may be formed of two stages in such a manner that transmission information is adaptively divided into N sequences in response to the number of spread codes informed from the base station in the first stage, and further information sequence output from the first stage can be divided to m sequences in response to the number of spread codes informed from the base station in the second stage.

In the embodiments described above, the number of sued spread codes and the number of multi-valued modulations of the multi-valued modulation system have been decoded in the base station, and the decided results are informed to the mobile station as the communication mode. However, the number of used spread codes and the number of multi-valued modulations of the multi-valued modulation system may be decided by each mobile station.

Further, the state of a transmission line and a traffic amount in the system are measured in each mobile station, the number of used spread codes and the multi-valued modulation of the multi-valued modulation system may be decided by the mobile station based on the measured result. With such a configuration, the present invention may be applied to a system for self-operating each mobile station.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information communication system wherein a first information communication apparatus and a second information communication apparatus perform information communication by a spread spectrum system within a frequency band predetermined for MC-CDMA communication by selecting usable spread codes from a plurality of spread codes provided by the system, the information communication system comprising:

communication mode determining means for adaptively determining a combination between a type of multi-level modulation scheme and the number of spread codes assigned to communication between the first and second information communication apparatuses, the combination being determined based on a traffic amount of the information communication system such that the combination enables an optimal transmission efficiency within the frequency band;

dividing means for dividing transmission information into information sequences corresponding in number to the spread codes which are assigned to the communication as determined by the communication mode determining means;

encoding means for performing error correction encoding with respect to the information sequences output from the dividing means;

primarily modulating means for primarily modulating the information sequences subjected to the error correction encoding by the encoding means on the basis of the multi-level modulation scheme determined by the communication determining means; and secondarily modulating means for selecting at least one spread code, which corresponds in number to the spread codes assigned to the communication as determined by the communication mode determining means, from the plurality of spread codes provided by the information communication system, and for secondarily modulating to transmit the selected spread code for the modulation signal sequence output from the primarily modulating means.

2. An information communication system according to claim 1, wherein the communication mode determining means adaptively determines a combination between a type of multi-level modulation scheme and the number of spread codes assigned to communication between the first and second information communication apparatuses, based on both the traffic amount of the information communication system and a communication mode desired by users of the information communication apparatuses, such that the combination enables an optimal transmission efficiency within the frequency band.

3. An information communication system according to claim 1 or 2, wherein when the first information communication apparatus is a mobile station and the second information communication apparatus is a base station, the communication mode determining means adaptively determines a combination between a type of multi-level modulation scheme and the number of spread codes assigned to communication between the first and second information communication apparatuses, such that the combination enables an optimal transmission efficiency within the frequency band, and the second information communication apparatus informs the first information communication apparatus of the determined communication mode.

4. An information communication system according to claim 2, wherein when the first information communication apparatus is a mobile station and the second information communication apparatus is a base station, the communication mode determining means informs the second information communication apparatus of a communication mode desired by a user of the first information communication apparatus, the second information communication apparatus adaptively determines a combination between a type of multi-level modulation scheme and the number of spread codes assigned to communication between the first and second information communication apparatuses, based on both the traffic amount of the information communication system and a desired communication mode informed by the first information communication apparatus, such that the combination enables an optimal transmission efficiency within the frequency band, and informs the first information communication apparatus of the determined communication mode from the second information communication apparatus to the first information communication apparatus.

5. An information communication system according to claim 2, wherein when the first information communication apparatus is a mobile station and the second information communication apparatus is a base station, the communication mode determining means adaptively determines a combination between a type of multi-level modulation scheme and the number of spread codes assigned to communication between the first and second information communication apparatuses, based on both the traffic amount of the information communication system of which the second information communication apparatus informs the first information communication apparatus and a communication mode desired by a user of the first information communication apparatus, such that the combination enables an optimal transmission efficiency within the frequency band.

6. An information communication system according to claim 1, wherein when the first information communication apparatus is a mobile station and the second information communication apparatus is a base station, the communication mode determining means determines the traffic amount of the information communication system on the basis of a state of the first information communication apparatus and adaptively determines a combination between a type of multi-level modulation scheme and the number of spread codes assigned to communication between the first and second information communication apparatuses, based on the determined traffic amount, such that the combination enables an optimal transmission efficiency within the frequency band.

7. An information communication system according to claim 2, wherein when the first information communication apparatus is a mobile station and the second information communication apparatus is a base station, the communication mode determining means determines the traffic amount of the information communication system on the basis of a state of the first information communication apparatus and adaptively determines a combination between a type of multi-level modulation scheme and the number of spread codes assigned to communication between the first and second information communication apparatuses, based on both the determined traffic amount and a communication mode desired by a user of the first information communication apparatus, such that the combination enables an optimal transmission efficiency within the frequency band.

8. An information communication system according to claims 1 or 2, wherein the communication mode determining means adaptively determines a combination between a type of multi-level modulation scheme and the number of spread codes assigned to communication between the first and second information communication apparatuses, such that the combination enables an optimal transmission efficiency within the frequency band, the combination being determined during formation of a sequence of a communication link which is to be conducted before starting the communication between the first and second information communication apparatuses.

9. An information communication system according to claim 8, wherein the communication mode determining means monitors a change in the traffic amount of the information communication system during the communication between the first and second information communication apparatuses, and alters the combination between a type of multi-level modulation scheme and the number of spread codes assigned to communication between the first and second information communication apparatuses, based on the traffic amount of the information communication system, such that the altered combination enables an optimal transmission efficiency within the frequency band, the communication mode determining means altering the combination when the change of at least a predetermined amount is detected.

10. An information communication system according to claim 8, wherein the communication mode determining means monitors a change in the traffic amount of the information communication system during the communication between the first and second information communication apparatuses, and alters the combination between a type of multi-level modulation scheme and the number of spread codes assigned to communication between the first and second information communication apparatuses, based on the traffic amount of the information communication system and a communication mode desired before the information communication apparatus is started to communicate, such that the altered combination enables an optimal transmission efficiency within the frequency band, the communication mode determining means altering the combination when the change of at least a predetermined amount is detected.

11. An information communication system according to claim 1, wherein the communication mode determining means monitors a quality of a transmission line between the first and second information communication apparatuses and the traffic amount of the information communication system and, on the basis of results of monitoring, adaptively determines the combination between a type of multi-level modulation scheme and the number of spread codes assigned to communicate between the first and second information communication apparatuses, such that the combination enables an optimal transmission efficiency within the frequency band.

12. An information communication system according to claim 2, wherein the communication mode determining means monitors a quality of a transmission line between the first and second information communication apparatuses and the traffic amount of the information communication system and, on the basis of results of monitoring and a communication mode desired by users of the information communication apparatuses, adaptively determines the combination between a type of multi-level modulation scheme and the number of spread codes assigned to communicate between the first and second information communication apparatuses, such that the combination enables an optimal transmission efficiency within the frequency band.

13. An information communication system according to claim 1, wherein the dividing means divides the transmission information into information sequences which are different in significance, in accordance with the number of spread codes which the communication mode determining means assigns to the communication, and the encoding means performs error correction encoding with respect to each of the information sequences, by use of an error correction code having an error correction capacity corresponding to the significance.

14. An information communication system wherein a first information communication apparatus and a second information communication apparatus perform information communication by a spread spectrum system within a frequency band predetermined for MC-CDMA communication by selecting usable first spread codes from a plurality of first spread codes provided by the system and usable second spread codes from a plurality of second spread codes provided by the system, the information communication system comprising:

communication mode determining means for adaptively determining a combination among a type of multi-level modulation scheme, the number of first spread codes assigned to communication between the first and second information communication apparatuses and the number of second spread codes assigned to the communication, the combination being determined based on a traffic amount of the information communication system such that the combination enables an optimal transmission efficiency within the frequency band;

dividing means for dividing transmission information into information sequences corresponding in number to the first spread codes which are assigned to the communication as determined by the communication mode determining means;

encoding means for performing error correction encoding with respect to the information sequences output from the dividing means;

primarily modulating means for primarily modulating the information sequences subjected to the error correction encoding by the encoding means on the basis of the multi-level modulation scheme determined by the communication determining means; and secondarily spread modulating means for selecting at least one second spread code, which corresponds in number to the spread codes assigned to the communication as determined by the communication mode determining means, from the plurality of second spread codes provided by the information communication system, and for secondarily modulating to transmit the selected second spread code for the modulation signal sequence output from the primarily modulating means.

15. An information communication apparatus for a mobile information communication system that provides a plurality of spread codes and selectively uses the plurality of spread codes for communication between a mobile station and a base station to transmit information, the information communication apparatus comprising:

communication mode determining means for adaptively determining a combination between a type of multi-level modulation scheme and the number of spread codes assigned to the communication between the mobile station and the base station, the combination being determined based on a traffic amount of the information communication system such that the combination enables an optimal transmission efficiency within the frequency band; and communication mode informing means for informing the mobile station of the determined combination between a type of multi-level modulation scheme and the number of spread codes assigned to the communication.

16. An information communication apparatus according to claim 15, wherein the communication mode determining means informs the base station of a communication mode desired by a user of the mobile station, the base station adaptively determines a combination between a type of multi-level modulation scheme and the number of spread codes assigned to communication between the mobile station and the base station, based on both the traffic amount of the information communication system and a desired communication mode informed by the mobile station, such that the combination enables an optimal transmission efficiency within the frequency band, and the base station informs the mobile station of the determined communication.

17. An information communication apparatus to be used as a mobile station for a mobile information communication system that provides a plurality of spread codes and selectively uses the plurality of spread codes between the mobile station and a base station to transmit information by a spread spectrum system, the information communication apparatus comprising:

communication mode determining means for adaptively determining a combination between a type of multi-level modulation scheme and the number of spread codes assigned to communication between the mobile station and the base station, the combination being determined based on a traffic amount of the information communication system such that the combination enables an optimal transmission efficiency within the frequency band;

dividing means for dividing transmission information into information sequences corresponding in number to the spread codes which are assigned to the communication as determined by the communication mode determining means;

encoding means for performing error correction encoding with respect to the information sequences output from the dividing means;

modulating means for selecting the multi-level modulation scheme determined by the communication mode determining means from a plurality of types of multi-level modulations for error correction encoding, and for modulating the information sequences subjected to error correction encoding by the encoding means according to the selected multi-level modulation system; and spread modulating means for selecting at least one spread code, which corresponds in number to the spread codes assigned to the communication as determined by the communication mode determining means, from the plurality of spread codes provided by the information communication system, and for spread modulating the modulation signal sequence output from the modulation means by the selected spread code to transmit the signal sequence.

18. An information communication apparatus according to claim 17, wherein the communication mode determining means receives information representing the traffic amount of the information communication system from the base station, and adaptively determines a combination between a type of multi-level modulation scheme and the number of spread codes assigned to communication between the mobile station and the base station, based on both the information representing the traffic amount of the information communication system and a communication mode desired by a user of the mobile station, such that transmission efficiency within the frequency band is optimal.

19. An information communication apparatus according to claim 17, wherein the communication mode determining means determines the traffic amount of the information communication system on the basis of a state of the mobile station and adaptively determines a combination between a type of multi-level modulation scheme and the number of spread codes assigned to communication between the mobile station and the base station, based on both the determined traffic amount and a communication mode desired by a user of the mobile station, such that the combination enables an optimal transmission efficiency within the frequency band.

* * * * *